US 8,502,865 B2

(12) United States Patent
Lee et al.

(10) Patent No.: US 8,502,865 B2
(45) Date of Patent: Aug. 6, 2013

(54) MIRROR AND ADJUSTMENT METHOD THEREFOR

(75) Inventors: Hou-Hsien Lee, Taipei Hsien (TW);
Chang-Jung Lee, Taipei Hsien (TW);
Chih-Ping Lo, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 399 days.

(21) Appl. No.: 12/871,945

(22) Filed: Aug. 31, 2010

(65) Prior Publication Data

US 2012/0026617 A1    Feb. 2, 2012

(30) Foreign Application Priority Data

Jul. 30, 2010   (TW) ................................ 99125411 A

(51) Int. Cl.
*H04N 7/18*    (2006.01)
(52) U.S. Cl.
USPC .............................. 348/77; 700/275; 382/255
(58) Field of Classification Search
USPC ........................................................... 348/77
See application file for complete search history.

(56) References Cited

U.S. PATENT DOCUMENTS

| 6,049,674 | A | * | 4/2000 | Yamamoto et al. | ................ 396/2 |
| 7,184,606 | B2 | * | 2/2007 | Shindo et al. | ................. 382/255 |
| 7,272,267 | B1 | * | 9/2007 | Nakajima | ...................... 382/294 |
| 8,081,432 | B2 | | 12/2011 | Li et al. | |
| 8,098,293 | B2 | * | 1/2012 | Nakanishi et al. | ......... 348/222.1 |
| 2006/0183544 | A1 | * | 8/2006 | Okada | ............................. 463/31 |
| 2010/0164731 | A1 | * | 7/2010 | Xie | ............................. 340/573.1 |
| 2010/0295782 | A1 | * | 11/2010 | Binder | .......................... 345/158 |
| 2011/0001793 | A1 | * | 1/2011 | Moriyama et al. | .............. 348/46 |
| 2011/0216235 | A1 | * | 9/2011 | Waite | ....................... 348/333.11 |

FOREIGN PATENT DOCUMENTS

| CN | 101714313 A | 5/2010 |
| JP | 10-179655 A | 7/1998 |

* cited by examiner

*Primary Examiner* — Anner Holder
(74) *Attorney, Agent, or Firm* — Altis Law Group, Inc.

(57) ABSTRACT

A method for adjusting a mirror. The method includes using a time-of-flight (TOF) camera to capture an image of a scene in front of a reflecting portion of the mirror and obtaining data about distances between a number of points in the scene and the TOF camera. Building a three dimension (3D) model of the scene. Analyzing the 3D model to locate a face region in the 3D model. Obtaining a first midline between a reference eyeline in the face region and a top of the face region. Obtaining a second midline of the 3D model, comparing the first and second midlines to determine whether the two midlines overlap. Output a comparison signal upon the condition that the two midlines do not overlap; and directing a driving apparatus to move the mirror to adjust a height of the mirror according to the comparison signal.

9 Claims, 9 Drawing Sheets

MIRROR AND ADJUSTMENT METHOD THEREFOR

CROSS-REFERENCE TO RELATED APPLICATION

Relevant subject matter is disclosed in the co-pending U.S. patent application Ser. No. 12/823,146 having the same title, which is assigned to the same assignee as named herein.

BACKGROUND

1. Technical Field

The present disclosure relates to a mirror and an adjustment method for the mirror.

2. Description of Related Art

Most mirrors are of fixed size. When looking into a full or half length mirror, people of different heights may need to bend or stand on a support to see the part of themselves that they want to see in the mirror. If the mirror is not fixed to a wall, the height of the mirror may be adjusted. Adjustments may depend on whether the mirror is full or half length. However, this is an inconvenience. Therefore there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

Figure 1:
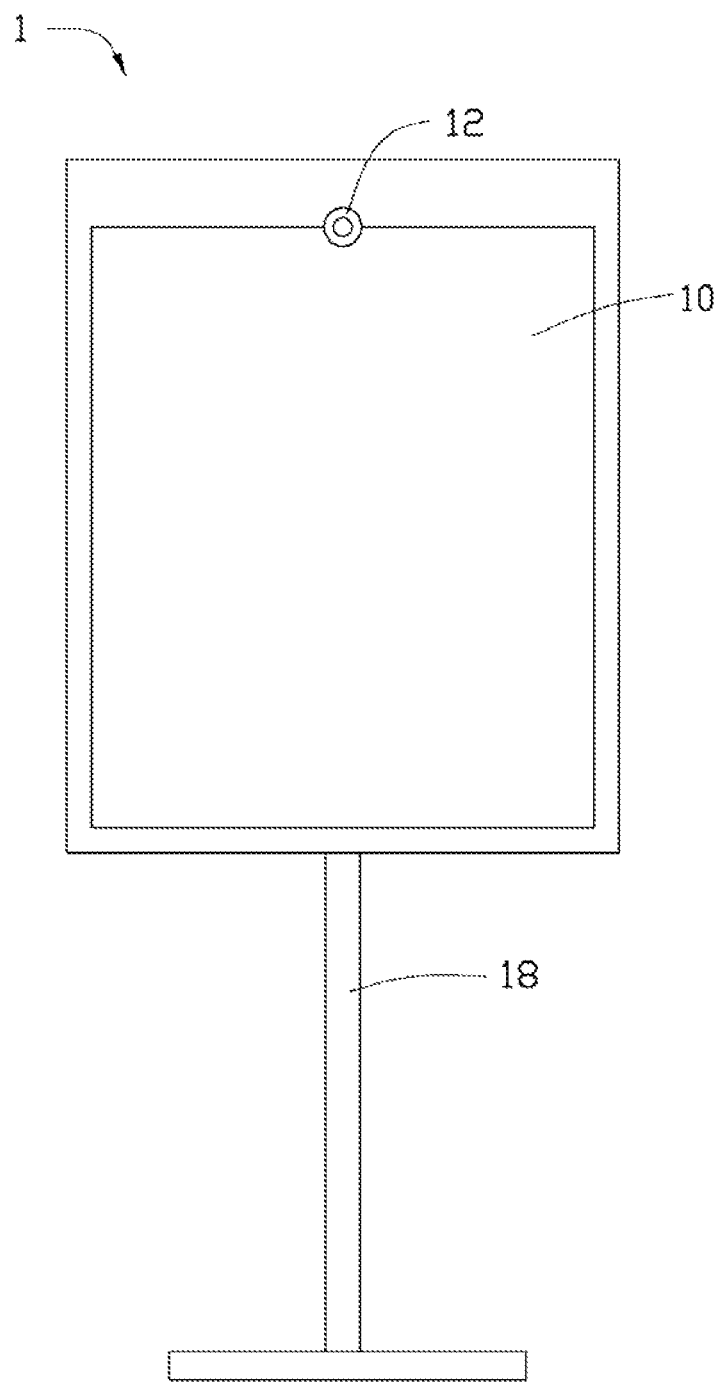
FIG. 1 is a schematic diagram of an exemplary embodiment of a mirror with a driving apparatus.
Figure 2:
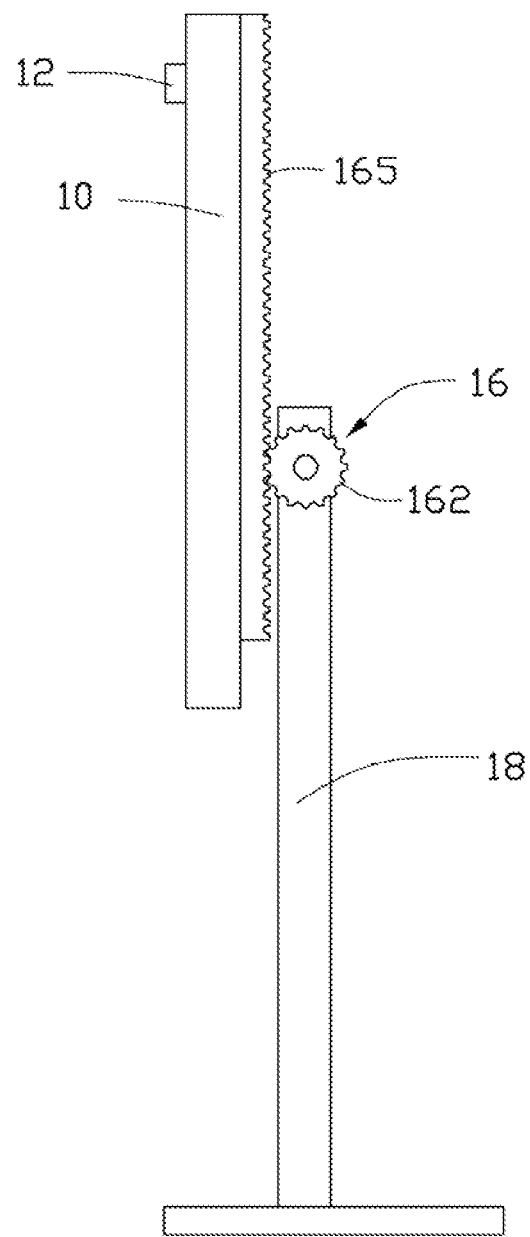
FIG. 2 is another schematic diagram of the mirror of FIG. 1.
Figure 3:
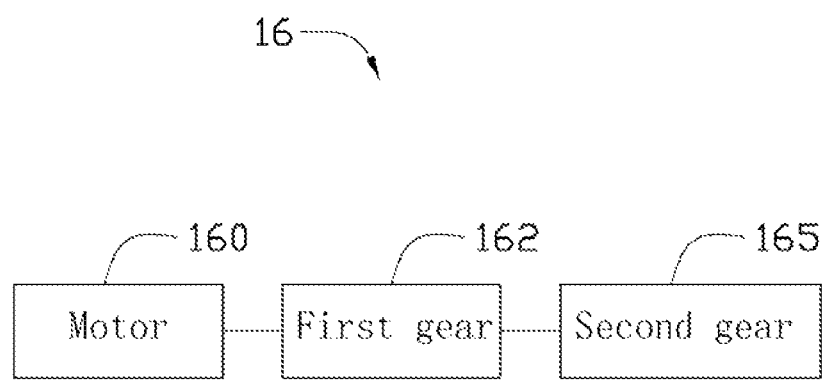
FIG. 3 is a block diagram of the driving apparatus of FIG. 1.
Figure 4:
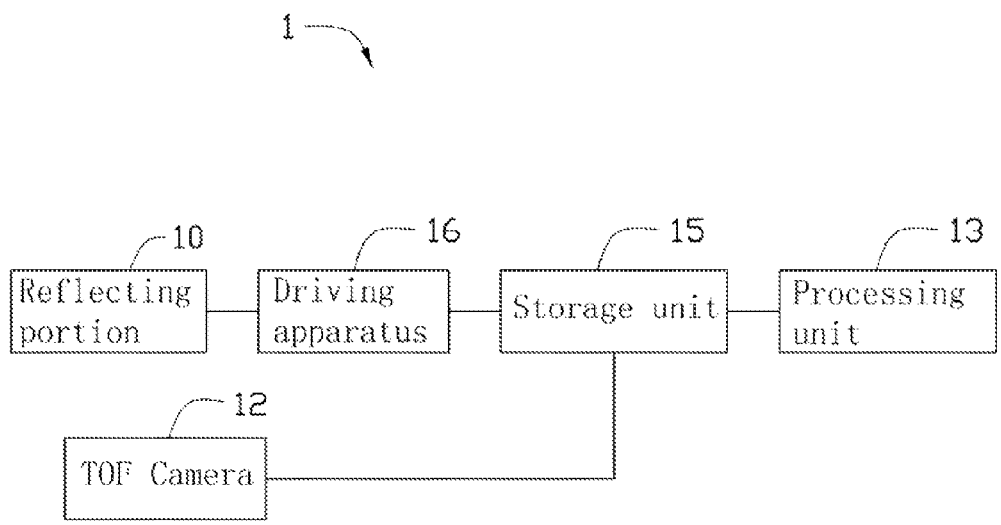
FIG. 4 is a block diagram of the mirror of FIG. 1 with a storage unit.

The disclosure, including the accompanying drawings, is illustrated by way of example and not by way of limitation. It should be noted that references to "an" or "one" embodiment in this disclosure are not necessarily to the same embodiment, and such references mean at least one.

While the following description details a method for adjusting a mirror to allow viewing of the top of a viewer when the mirror is shorter than the viewer, adjustment of the mirror to allow viewing of the bottom of the viewer involves similar methodology.

Referring to FIGS. 1 to 4, an exemplary embodiment of a mirror 1 includes a reflecting portion 10, a time-of-flight (TOF) camera 12, a storage unit 15, a processing unit 13, a driving apparatus 16, and a stand 18. A height of the mirror 1 can be adjusted according to a height of a viewer.

The reflecting portion 10 is for reflecting an image of a viewer in front of the reflecting portion 10. The TOF camera 12 is mounted on a top of the reflecting portion 10, with a center of a lens of the TOF camera 12 aligning with the top edge of the reflecting portion 10. The TOF camera 12 captures images of a scene in front of the reflecting portion 10, and creates data about distances between a plurality of points in the scene and the TOF cameras 12. The processing unit 13 and the storage unit 15 process the images and the data about distances from the TOF camera 12 to obtain a three dimension (3D) model of the scene in front of the reflecting portion 10, for determining a midline between a reference eyeline of the viewer and a top of the viewer, and a midline of the 3D model. The processing unit 13 and the storage unit 15 further adjust the height of the reflecting portion 10 by the driving apparatus 16 to overlap the two midlines. As a result, the location of the top edge of the reflecting portion 10 is on a level with the midline between the reference eyeline and the top of the viewer. A full image of the top of the viewer is visible in the reflecting portion 10.

The TOF camera 12 is a camera system that creates data about distances between a plurality of points in front of the reflecting portion 10 and the TOF camera 12. When the TOF camera 12 shoots the scene in front of the reflecting portion 10, the TOF camera 12 sends radio frequency (RF) signals. The RF signals would return to the TOF camera 12 when the RF signals meet an object, such as a desk in the scene. As a result, the data about distances can be obtained according to time differences between sending and receiving the RF signals of the TOF camera 12.

In the embodiment, the driving apparatus 16 includes a motor 160, a first gear 162, and a second gear 165. The first gear 162 is mounted on the stand 18, and is a wheel gear. The second gear 165 is mounted on a back of the reflecting portion 10, and is a toothed track. The motor 160 rotates the first gear 162 to change the height of the reflecting portion 10.

Figure 5:
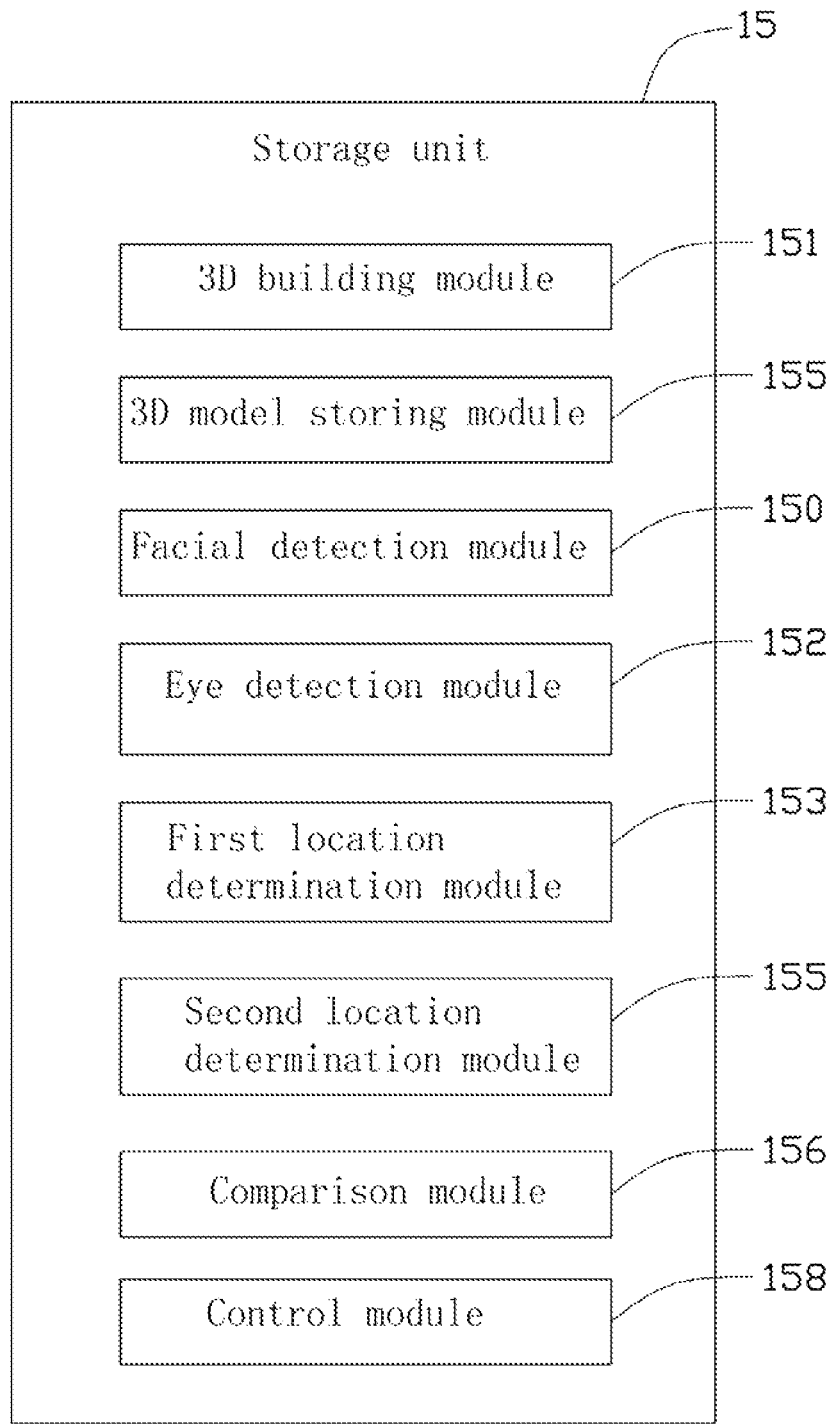
FIG. 5 is a block diagram of the storage unit of FIG. 4.

Referring to FIG. 5, the storage unit 15 includes a 3D building module 151, a 3D model storing module 155, a facial detection module 150, an eye detection module 152, a first location determination module 153, a second location determination module 155, a comparison module 156, and a control module 158, which may include one or more computerized instructions executed by the processing unit 13.

The 3D model building module 151 builds a 3D model of the scene in front of the reflecting portion 10 according to the image captured by the TOF camera 12 and the data about distances between the plurality of points in the scene and the TOF camera 12. In the embodiment, according to the data about distances between the plurality of points in the scene in front of the reflecting portion 10 and the TOF camera 12, the plurality of points in the scene has coordinates relative to the TOF camera 12. The 3D model building module 151 can obtain a 3D mathematical model according to the coordinates of the plurality of points and the image. The 3D mathematical model can be regarded as the 3D model of the scene in front of the reflecting portion 10.

The 3D model storing module 155 stores a plurality of different 3D models of human faces. The different 3D models of human faces can be obtained by the TOF camera 12 in advance.

The facial detection module 150 locates a face region in the 3D mode, using known feature recognition technology. In the embodiment, the facial detection module 150 compares the different 3D models of human faces stored in the 3D model storing module 155 with the obtained 3D model of the scene in front of the reflecting portion 10 to locate the face region in the 3D model of the scene.

The eye detection module 152 locates a reference eyeline of the eye in the face region of the 3D model, again using known recognition technology. In some embodiments, a top one-third of the face region can be regarded as the reference eyeline.

The first location determination module 153 obtains a midline between the reference eyeline and a top of the viewer in the 3D model. In the embodiment, the top of the viewer in the 3D model may be regarded as a top of the face region in the 3D model. The second location determination module 155 obtains a midline of the 3D model on a Y-axis of a coordinate system.

The comparison module 156 compares the two midlines, and outputs a corresponding comparison signal to the control module 158. The control module 158 directs the driving apparatus 16 to adjust the height of the reflecting portion 10.

Figure 6:
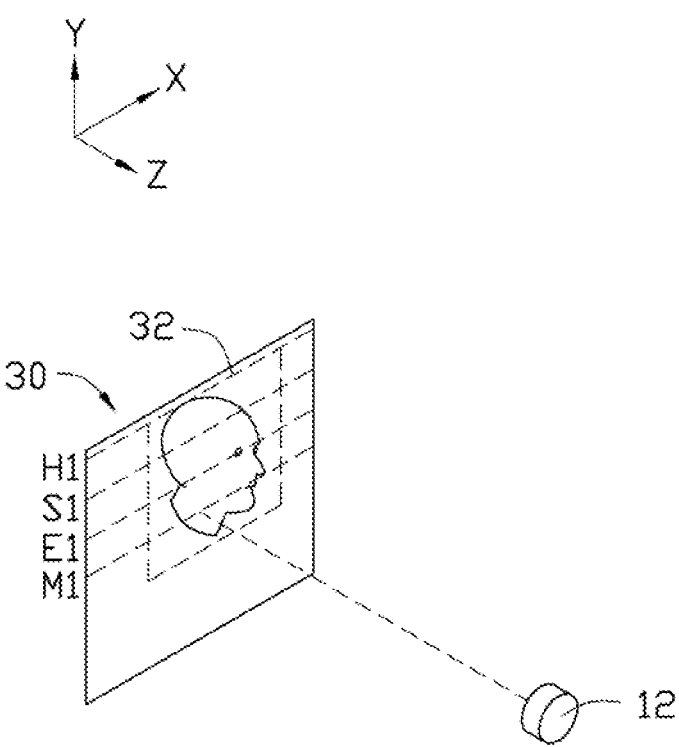
FIGS. 6 and 7 are schematic views showing adjustment of the mirror of FIG. 1.

Referring to FIG. 6, the TOF camera 12 captures an image of the scene in front of the reflecting portion 10 and obtains data about distances. The 3D model building module 151 builds a 3D model 30 of the scene in front of the reflecting portion 10 according to the image captured by the TOF camera 12 and the data about distances. In the embodiment, in the 3D model 30, other portions, such as the shoulder and neck, are cropped.

The facial detection module 150 analyses the 3D model 30 to locate a face region 32 in the 3D model 30. The eye detection module 152 analyses the face region 32 to locate the reference eyeline E1 in the face region 32. A top of the face region 32 in the 3D model 30 is marked as a broken line H1. As a result, the first location determination module 153 obtains a midline S1 between the broken lines E1 and H1.

The second location determination module 155 obtains the midline M1 of the 3D model 30 on the Y-axis in the coordinate system. The comparison module 156 compares the two midlines S1 and M1, and, in the event of a misalignment therebetween, outputs a corresponding comparison signal to the control module 158.

The control module 158 directs the driving apparatus 16 to move the reflecting portion 10 up a distance. Conversely, if the middle line S1 between the reference eyeline E1 in the 3D model 30 and the location of the top of the face region 32 in the 3D model 30 is lower than the midline M1 of the 3D model 30, the control module 158 directs the driving apparatus 16 to move the reflecting portion 10 down a distance. Such adjustments are repeated, referring to FIG. 7, to overlap the two midlines M1 and S1, after completion of which, the control module 158 stops the driving apparatus 16.

Figure 7:
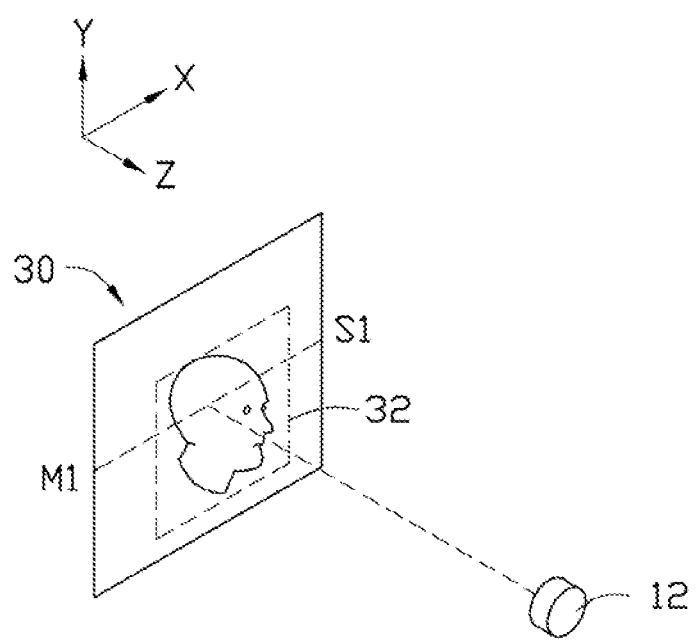
Figure 8:
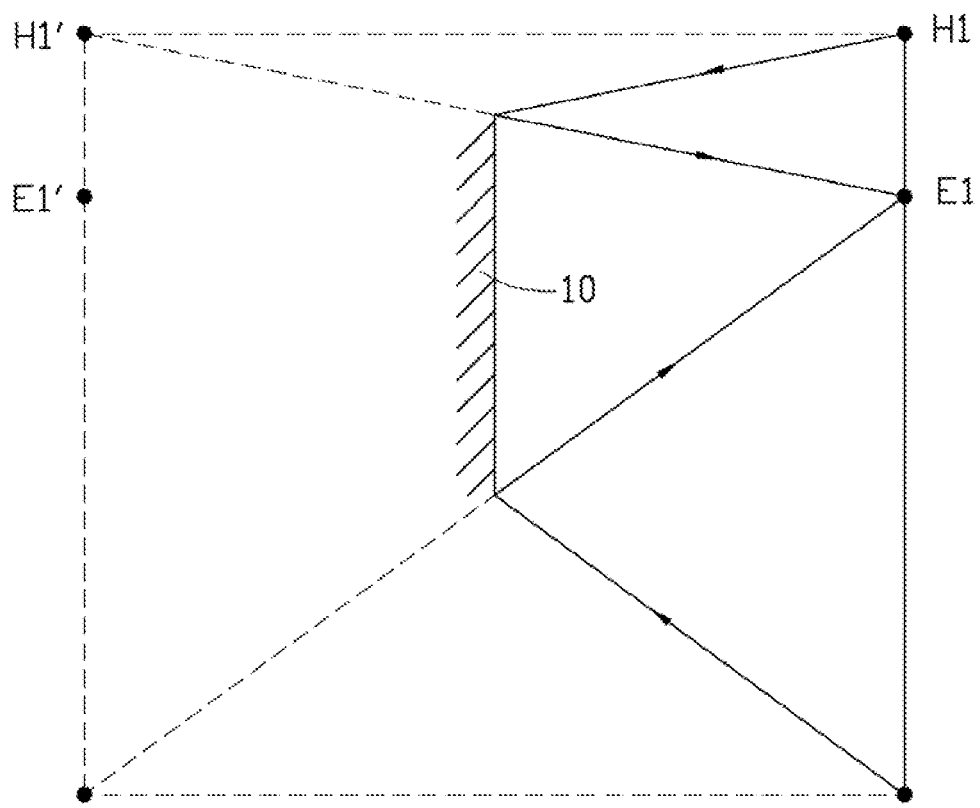
FIG. 8 is a schematic diagram of a reflected object in front of a mirror.

The midline M1 of the 3D model 30 is aligned with the TOF camera 12, and the TOF camera 12 is mounted on the top edge of the reflecting portion 10, such that the top edge of the reflecting portion 10 is aligned with the midline M1 of the 3D model 30. In FIG. 7, the two midlines M1 and S1 overlapping denotes that the location of the top edge of the reflecting portion 10 is overlapped with the midline S1 between the reference eyeline E1 and the top of the face region 32. As a result, as shown in FIG. 8, the top of the face region 32 is visible in the reflecting portion 10.

Figure 9:
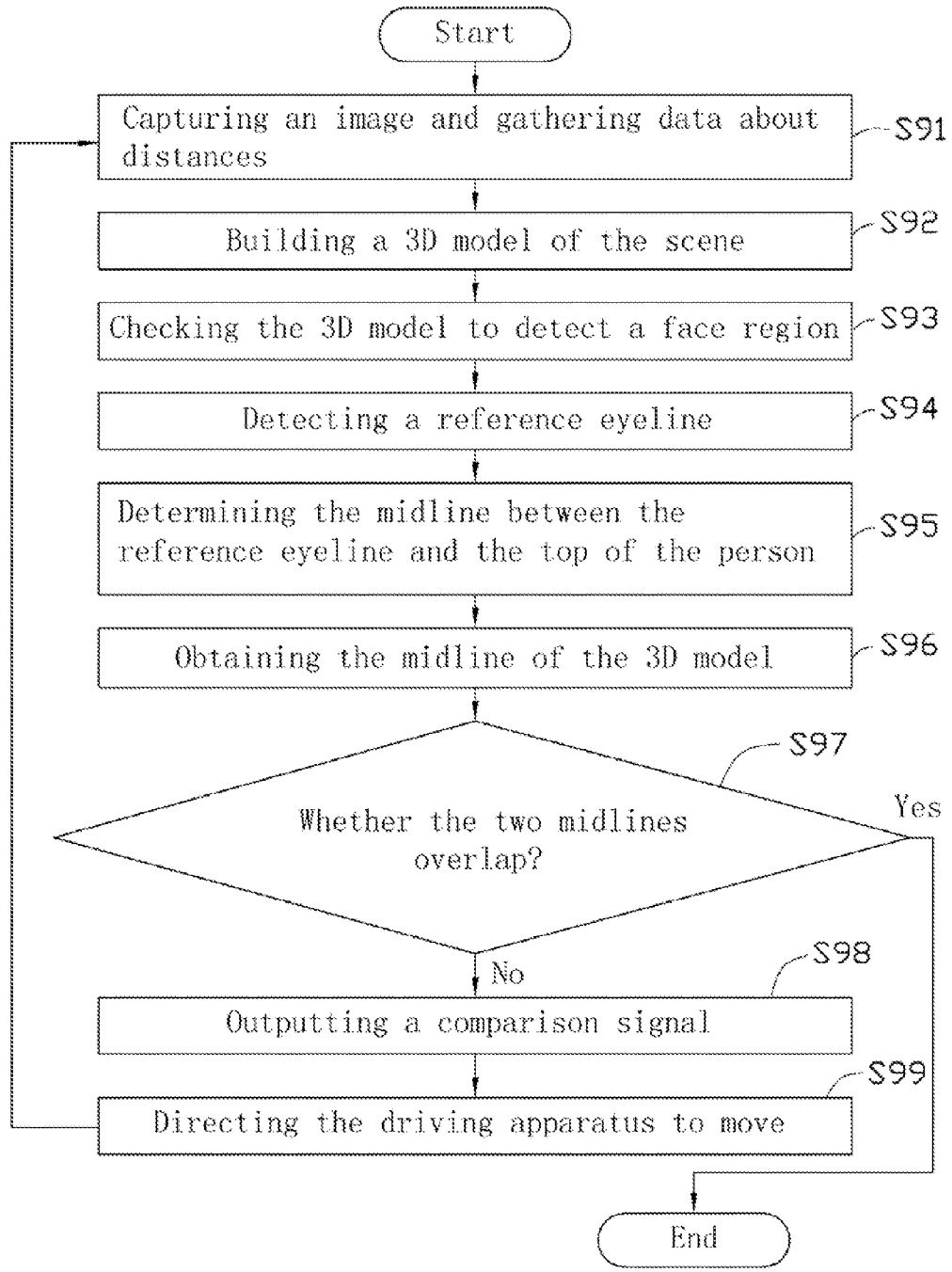
FIG. 9 is a flowchart of an exemplary embodiment of an adjustment method for a mirror.

FIG. 9 shows an adjustment method for the mirror 1.

In step S91, the TOF camera 12 captures an image of a scene in front of the reflecting portion 10. The TOF camera 12 further gathers data about distances between a plurality of points in the scene and the TOF camera 12.

In step S92, the 3D model building module 155 builds a 3D model 30 of the scene in front of the reflecting portion 10 according to the image captured by the TOF camera 12 and the data about distances between the plurality of points in the scene and the TOF camera 12.

In step S93, the facial detection module 150 analyzes the 3D model 30 to locate a face region 32 in the 3D model 30.

In step S94, the eye detection module 152 analyzes the 3D model 30 to locate a reference eyeline E1 in the face region 32.

In step S95, the first location determination module 153 determines the midline S1 between the reference eyeline E1 and the top of the person H1 in the 3D model 30.

In step S96, the second location determination module 155 determines the midline M1 of the 3D model 30.

In step S97, the comparison module 156 compares the two midlines S1 and M1 to determine whether the two midlines S1 and M1 overlap. Upon the condition that the two midlines S1 and M1 overlap, the top of the person is visible in the reflecting portion 10 and the process ends. Upon the condition that the two midlines S1 and M1 do not overlap, step S98 is implemented.

In step S98, the comparison module 156 outputs a comparison signal according to the comparison result.

In step S99, the control module 158 directs the driving apparatus 16 to move according to the comparison signal, and step S91 is repeated.

The foregoing description of the embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A mirror comprising:
   a glass reflecting portion mounted to a stand;
   a time-of-flight (TOF) camera, a center of a lens of the TOF camera aligns with a top edge of the reflecting portion;
   a driving apparatus to adjust a location of the reflecting portion on the stand, for changing a height of the mirror;
   a processing unit; and
   a storage unit connected to the processing unit, the TOF camera, and the driving apparatus, and storing a plurality of programs to be executed by the processing unit, wherein the storage unit comprises:
   a three dimension (3D) building module to build a 3D model according to an image of a scene captured by the TOF camera and data about distances between a plurality of points in the scene and the TOF camera;
   a facial detection module analyzing the 3D model to locate a face region therein;
   a first location determination module to obtain a first midline between a reference eyeline in the face region and a top edge of the face region;
   a second location determination module to obtain a second midline of the 3D model;
   a comparison module to compare the first and second midlines to determine whether the first and second midlines overlap, and output a comparison signal upon the condition that the first and second midlines do not overlap; and a control module directing the driving apparatus to move the reflecting portion relative to the stand according to the comparison signal.

2. The mirror of claim 1, wherein a top one-third of the face region is regarded as the reference eyeline.

3. The mirror of claim 1, wherein the storage unit further comprises an eye detection module, analyzing the 3D model to locate the reference eyeline in the face region.

4. The mirror of claim 1, wherein the driving apparatus comprises a motor, a first gear, and a toothed track, the first gear mounted on the stand and the toothed track mounted on a back of the mirror portion, whereby the motor rotates the first gear to rotate to change the height of the mirror portion.

5. The mirror of claim 1, wherein the storage unit further comprises a 3D model storing module, the 3D model storing module stores a plurality of different 3D models of human faces, the facial detection module compares the different 3D models of human faces stored in the 3D model storing module with the 3D model of the scene in front of the reflecting portion to detect the face region.

6. An adjustment method for a mirror, the adjustment method comprising:
- capturing an image of a scene in front of a glass reflecting portion of the mirror by a time-of-flight (TOF) camera, and obtaining data about distances between a plurality of points in the scene and the TOF camera;
- building a three dimension (3D) model according to the image and the data about distances between the plurality of points in the scene and the TOF camera;
- analyzing the 3D model to locate a face region in the 3D model;
- obtaining a first midline between a reference eyeline in the face region and a top edge of the face region;
- obtaining a second midline of the 3D model;
- comparing the first and second midlines to determine whether the first and second midlines overlap, and outputting a comparison signal when the first and second midlines do not overlap; and
- directing a driving apparatus to move the mirror to adjust a height of the mirror, according to the comparison signal.

7. The adjustment method of claim 6, wherein a top one-third of the face region is regarded as the reference eyeline.

8. The adjustment method of claim 6, further comprising, between analyzing the 3D model to locate the face region in the 3D model and obtaining the first midline between the reference eyeline in the face region and a top of the face region, analyzing the 3D model to locate a reference eyeline in the face region.

9. The adjustment method of claim 6, wherein the step of "analyzing the 3D model to locate a face region in the 3D model" comprises:
- comparing the 3D model of the scene with a plurality of different 3D models of human faces to locate the face region in the 3D model.

* * * * *